United States Patent Office 3,164,437
Patented Jan. 5, 1965

3,164,437
PROCESS FOR THE COLORATION OF POLYETHYLENE TEREPHTHALATE TEXTILE MATERIALS
Alistair Howard Berrie, Harold Seaman, and Raymond Windle, all of Manchester, England, assignors to Imperial Chemical Industries Limited, London, England, a corporation of Great Britain
No Drawing. Filed Aug. 1, 1962, Ser. No. 213,902
Claims priority, application Great Britain, Aug. 28, 1961, 30,932
6 Claims. (Cl. 8—41)

This invention relates to a coloration process and more particularly it relates to a process for the coloration of aromatic polyester textile materials with water-insoluble dyestuffs.

As an example of a polyester textile material there may be mentioned polyethylene terephthalate. Such material may be in any desired form, for example threads, yarn or woven or knitted fabric.

By "water-insoluble azo dyestuffs" is meant, as will be understood by those skilled in the art, dyestuffs which are free from water-solubilising groups. Water solubilising groups which are typically present in water-soluble azo dyestuffs are sulphonic acid, and acyl sulphonamido groups. Such water-solubilising groups are not present in water-insoluble dyestuffs of our invention. It will be recognised, of course, that these water-solubilising groups are all essentially acidic groups, and will form salts if a dyestuff containing the same is placed in an aqueous alkaline medium. Accordingly, it will be understood that the term "water-insoluble azo dyestuff" is used herein in its conventional sense as meaning that there are no such sulphonic acid, or acyl sulphonamido groups, or salts of such groups, in the dyestuff molecule.

According to the invention we provide a process for the coloration of aromatic polyester textile material which comprises applying thereto a water-insoluble dyestuff of the formula:

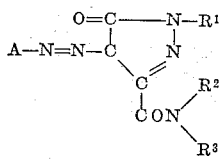

wherein A represents an aromatic radical of the carbocyclic or heterocyclic series, $R^1$ is hydrogen or a substituted or unsubstituted alkyl, aralkyl or aryl radical, and $R^2$ and $R^3$ may independently represent hydrogen or substituted or unsubstituted alkyl, aralkyl, or aryl radicals or may together represent the atoms necessary to form, with the adjacent nitrogen atom, a heterocyclic ring, provided that the dyestuff is devoid of water-solubilising groups, and provided also that $R^2$ and $R^3$ are not both hydrogen when A and $R^1$ are both phenyl or substituted phenyl radicals, the same or different.

The aromatic radicals represented by A may be of the carbocyclic, for example the benzene or naphthalene series, or of the heterocyclic, for example the thiazole or benzthiazole series. All such radicals may carry substituents other than water-solubilising groups, for example they may carry as substituents halogen atoms such as chlorine or bromine, alkyl groups such as methyl, ethyl, n-propyl or iso-butyl, alkoxy groups such as methoxy, ethoxy or beta-methoxyethoxy-, acyl groups such as acetyl, propionyl or n-butyryl, acylamido groups such as acetamido or p-toluene sulphonamido, amino, nitro, cyano, thiocyano, trifluoromethyl or carboxy groups.

As examples of radicals which may be represented by $R^1$ and independently represented by $R^2$ and $R^3$ there may be mentioned methyl, ethyl, beta-hydroxyethyl, gamma-methoxy-n-propyl, benzyl, phenyl, p-tolyl, p-nitrophenyl, o-methoxyphenyl, p-methoxyphenyl, o-ethoxyphenyl, o-(beta-methoxyethoxy)phenyl.

As examples of heterocyclic rings which may be formed by $R^2$ and $R^3$ with the adjacent nitrogen atom there may be mentioned piperidine, piperazine, and morpholine.

The water-insoluble dyestuffs used in the process of the invention may be obtained in conventional manner by diazotising amines of the formula A—NH$_2$ and then coupling with coupling components of the formula

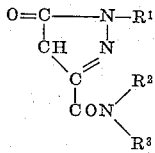

As examples of amines of the formula A—NH$_2$ there may be mentioned aniline, alpha- and beta-naphthylamine, 2-aminothiazole, 2-aminobenzthiazole, p-toluidine, p-nitroaniline, 2-cyano - 4 - nitroaniline, 4-aminophenylmethylsulphone, 4-aminobenzenesulphonamide, 4-amino-3-chlorobenzenesulphonamide, o-, m-, and p-chloroaniline, 2-nitro-4-methylaniline, 2-cyano-4-methylaniline, o-anisidine, p-anisidine, 2:5-dimethoxyaniline, 2-methoxy-4-nitroaniline, 2-chloro-4-nitroaniline, anthranilic acid, and 4-aminoazobenzene.

As examples of coupling components of the above formula there may be mentioned 1-phenyl-3-carbamoyl-5-pyrazolone,
3-carbamoyl-5-pyrazolone,
1-methyl-3-carbamoyl-5-pyrazolone,
1-(2'-methoxyphenyl)-3-carbamoyl-5-pyrazolone,
1-phenyl-3-(N-methylcarbamoyl)-5-pyrazolone,
1-phenyl-3-(N-ethylcarbamoyl)-5-pyrazolone,
1-phenyl-3-(N:N-dimethylcarbamoyl)-5-pyrazolone,
1-phenyl-3-(N-beta-methoxyethyl-carbamoyl)-5-pyrazolone,
1-phenyl-3-(N-phenylcarbamoyl)-5-pyrazolone,
1-phenyl-3-(N-methyl-N-phenyl-carbamoyl)-5-pyrazolone,
1-phenyl-3-(p-methoxyphenylcarbamoyl)-5-pyrazolone,
1-phenyl-3-(o-methoxyphenylcarbamoyl)-5-pyrazolone,
1-phenyl-3-(o-(beta-methoxyethoxy)phenylcarbamoyl)-5-pyrazolone and
1-(naphth-1-yl)-3-carbamoyl-5-pyrazolone.

The process of the invention may be carried out by immersing the aromatic polyester textile material in a dyebath comprising an aqueous dispersion of a water-insoluble dyestuff as hereinbefore defined, the dispersion being stabilized if desired by dispersing agents such as sulphonated naphthalene-formaldehyde condensates. The dyebath may be heated at or near the boiling point, with addition of a carrier such as diphenyl or o-hydroxydiphenyl, or it may be heated above 100° C. in a closed vessel, with or without the addition of a carrier.

Alternatively an aqueous dispersion of the water-insoluble dyestuff may be padded on to the aromatic polyester textile material and fixed by baking the material, for example for 1 to 2 minutes at between 180° and 220° C. The padding liquor may advantageously contain a thickener or migration inhibitor and other additives such as urea.

If desired, the process of the invention may be carried out by applying to the surface of the textile material a thickened printing paste containing an aqueous dispersion of the water-insoluble dyestuff, and subsequently steaming or baking. Suitable thickening agents include gum tragacanth, gum arabic, Nafka crystal gum, alginates, or oil-in-water or water-in-oil emulsions. The printing paste may also contain commonly used adjuvants such as surface active agents and sodium m-nitrobenzene sulphonate.

After carrying out the process of the invention the textile material may be removed from the dyebath, steamer or baker, rinsed and treated with soap or synthetic detergent. It is also advantageous to treat the textile material with a weak alkaline solution of sodium hydrosulphite before soaping, since this helps to remove loosely attached dyestuff from the surface of the fibers.

The process of the invention provides a means whereby aromatic polyester textile materials may be coloured in yellow to red shades of good fastness to washing and to dry heat treatments.

Of particular interest for use in the process of the invention are the dyestuffs of the formula

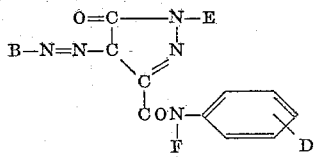

wherein B represents a radical of the benzene, naphthalene, thiazole or benzthiazole series, E represents a radical of the benzene series, F represents hydrogen or a lower alkyl radical, D represents hydrogen or a lower alkoxy or alkoxyalkoxy radical and the term "lower" indicates a radical containing not more than 5 carbon atoms.

On aromatic polyester textile materials such dyestuffs produce yellow to red shades which are fast to washing, to dry heat and to light.

According to a further and preferred feature of our invention we provide, as new compounds, the water-insoluble dyestuffs of the formula:

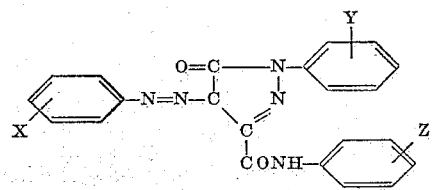

wherein X represents halogen or a lower carbalkoxy or carbo (substituted alkoxy) radical, Y represents hydrogen or halogen, Z represents hydrogen or a lower alkoxy or substituted alkoxy radical, and the term "lower" indicates a radical of not more than 5 carbon atoms.

The dyestuffs forming the preferred feature of our invention have very good affinity for aromatic polyester textile materials and may satisfactorily be applied at a dyebath temperature of 130° C. This is a valuable feature of the dyestuffs because much of the pressure dyeing equipment available in dyehouses will not, with safety, withstand the pressures created by heating to temperatures higher than 130° C. The preferred dyestuffs of our invention are outstanding in all fastness properties, particularly in fastness to washing, to light and to dry heat treatments at the very high temperatures such as are now used in the pleating of aromatic polyester textile materials.

In the above formula the halogen atoms representable by X and Y may be, for example, chlorine or bromine. The carbalkoxy or carbo (substituted alkoxy) radicals representable by X may be, for example, radicals of the formula —$COOCH_3$, —$COOC_2H_5$ or —$COOC_4H_9$, or carbo (alkoxyalkyl) radicals of the formula (e.g. —$COOC_2H_4OCH_3$ or —$COOC_2H_4OC_2H_5$. The alkoxy or substituted alkoxy radicals representable by Z may be, for example, radicals of the formula —$OCH_3$, —$OC_2H_5$, —$OC_4H_9$ or alkoxyalkoxy radicals of the formula (e.g.) —$OC_2H_4OCH_3$ or —$OC_2H_4OC_2H_5$.

The invention is illustrated but not limited by the following examples in which the parts and percentages are by weight.

Example 1

A dyebath is prepared by milling 1 part of 3-carbamoyl-4-(2'-methoxy-4'-nitrophenylazo)-5-pyrazolone with 80 parts of water containing 1 part of the sodium salt of a formaldehyde-napthalene sulphonic acid condensate and adding the dispersion so obtained to 4,000 parts of water containing 1.5 parts of oleyl sodium sulphate. 100 parts of polyethylene terephthalate fabric is placed in the dyebath which is then heated to 130° C. for 30 minutes in a closed vessel. The polyethylene terephthalate textile material is then rinsed in water and immersed for 15 minutes at 50° C. in an aqueous solution containing 0.2% of sodium hydroxide, 0.2% of sodium hydrosulphite and 0.1% of cetyl trimethyl ammonium bromide. The polyethylene terephthalate textile material is again rinsed in water and then immersed for 15 minutes in a warm aqueous solution of a synthetic detergent, rinsed in water and dried.

The polyethylene terephthalate textile material is dyed a yellow shade with good fastness to heat treatments.

Example 2

In place of 3-carbamoyl-4-(2'-methoxy-4'-nitrophenylazo)-5-pyrazolone in Example 1 there may be used 1-phenyl - 3 - (N - phenylcarbamoyl) - 4 - (2' - methoxy-4'-nitrophenylazo)-5-pyrazolone. The polyethylene terephthalate textile material is dyed a reddish yellow shade with good fastness to heat treatments.

The following table lists diazo (column 2) and coupling (column 3) components which may be coupled to produce dyestuffs suitable for dyeing polyethylene terephthalate textile material by the method described in Example 1. The shades of the dyestuffs are given in column 4.

| Example | Diazo Component | Coupling Component | Shade on polyethylene terephthalate |
|---|---|---|---|
| 3 | 1-naphthylamine | 1-phenyl-3-carbamoyl-5-pyrazolone | Orange. |
| 4 | 2-naphthylamine | do | Reddish yellow. |
| 5 | 2-methoxy-4-nitroaniline | 1-phenyl-3-N-methylcarbamoyl-5-pyrazolone | Orange. |
| 6 | do | 1-phenyl-3-N-ethylcarbamoyl-5-pyrazolone | Do. |
| 7 | do | 1-phenyl-3-N:N-diethylcarbamoyl-5-pyrazolone | Reddish yellow. |
| 8 | do | 1-phenyl-3-N-(β-methoxyethyl)carbamoyl-5-pyrazolone | Do. |
| 9 | do | 1-phenyl-3-N-methyl-N-phenylcarbamoyl-5-pyrazolone | Yellow. |
| 10 | do | 1-phenyl-3-N-(4'-methoxyphenyl)carbamoyl-5-pyrazolone | Orange. |
| 11 | do | 1-phenyl-3-N-(2'-methoxyphenyl)carbamoyl-5-pyrazolone | Do. |
| 12 | do | 1-phenyl-3-N-[2'-(β-methoxyethoxy)phenyl]carbamoyl-5-pyrazolone | Do. |
| 13 | do | 1-methyl-3-carbamoyl-5-pyrazolone | Yellow. |
| 14 | 2-nitro-4-methoxyaniline | 1-phenyl-3-N-methylcarbamoyl-5-pyrazolone | Orange. |
| 15 | do | 1-phenyl-3-N-methyl-N-phenylcarbamoyl-5-pyrazolone | Do. |
| 16 | do | 3-carbamoyl-5-pyrazolone | Do. |
| 17 | do | 1-phenyl-3-N:N-diethylcarbamoyl-5-pyrazolone | Reddish orange. |
| 18 | do | 1-phenyl-3-N-(2'-methoxyphenyl)carbamoyl-5-pyrazolone | Do. |
| 19 | do | 1-methyl-3-carbamoyl-5-pyrazolone | Do. |
| 20 | do | 1-phenyl-3-N-ethylcarbamoyl-5-pyrazolone | Do. |
| 21 | do | 1-phenyl-3-N-[2'-(β-methoxyethoxy)phenyl]carbamoyl-5-pyrazolone | Do. |
| 22 | do | 1-phenyl-3-N-phenylcarbamoyl-5-pyrazolone | Do. |
| 23 | do | 1-phenyl-3-N-(β-methoxyethyl)carbamoyl-5-pyrazolone | Orange. |
| 24 | do | 1-phenyl-3-N-(4'-methoxyphenyl)carbamoyl-5-pyrazolone | Reddish orange. |
| 25 | 2-nitroaniline | do | Orange. |
| 26 | do | 1-phenyl-3-N-(2'-methoxyphenyl)carbamoyl-5-pyrazolone | Do. |
| 27 | do | 1-phenyl-3-N-[2'-[β-methoxyethoxy)phenyl]carbamoyl-5-pyrazolone] | Do. |
| 28 | 4-nitroaniline | do | Do. |

| Example | Diazo Component | Coupling Component | Shade on polyethylene terephthalate |
|---|---|---|---|
| 29 | Methyl p-aminobenzoate | 1-phenyl-3-N-(4'-methoxyphenyl)carbamoyl-5-pyrazolone | Do. |
| 30 | Ethyl p-aminobenzoate | ----do---- | Do. |
| 31 | n-Butyl p-aminobenzoate | ----do---- | Do. |
| 32 | β-Ethoxyethyl p-aminobenzoate | ----do---- | Do. |
| 33 | Methyl anthranilate | ----do---- | Do. |
| 34 | Ethyl anthranilate | ----do---- | Yellow. |
| 35 | n-Butyl anthranilate | ----do---- | Do. |
| 36 | β-Ethoxyethyl anthranilate | ----do---- | Do. |
| 37 | Ethyl m-aminobenzoate | ----do---- | Reddish yellow. |
| 38 | 4-chloroaniline | ----do---- | Yellow. |
| 39 | 2-chloroaniline | ----do---- | Do. |
| 40 | β-Ethoxyethyl m-aminobenzoate | ----do---- | Do. |
| 41 | 4-amino-N:N-dimethylbenzamide | ----do---- | Orange. |
| 42 | 4-amino-N:N-diethylbenzamide | ----do---- | Reddish yellow. |
| 43 | 2-amino-N:N-dimethylbenzamide | ----do---- | Do. |
| 44 | 3-chloroaniline | ----do---- | Do. |
| 45 | 2:5-dichloroaniline | ----do---- | Do. |
| 46 | 2:4-dichloroaniline | ----do---- | Do. |
| 47 | 4-nitroaniline | ----do---- | Do. |
| 48 | 3-nitroaniline | ----do---- | Orange. |
| 49 | 2-nitro-4-methylaniline | ----do---- | Reddish yellow. |
| 50 | 2-methyl-4-nitroaniline | ----do---- | Orange. |
| 51 | Aniline | ----do---- | Do. |
| 52 | β-Ethoxyethyl m-aminobenzoate | ----do---- | Reddish yellow. |
| 53 | β-Ethoxyethyl p-aminobenzoate | ----do---- | Do. |
| 54 | 2-chloroaniline | ----do---- | Do. |
| 55 | 3-chloroaniline | ----do---- | Do. |
| 56 | 4-chloroaniline | ----do---- | Yellow. |
| 57 | 4-nitroaniline | ----do---- | Reddish yellow. |
| 58 | Aniline | ----do---- | Do. |
| 59 | 2-nitro-4-methylaniline | ----do---- | Yellow. |
| 60 | 2-nitroaniline | ----do---- | Reddish yellow. |
| 61 | 2:4-dichloroaniline | ----do---- | Do. |
| 62 | 3-nitroaniline | ----do---- | Yellow. |
| 63 | 2-methoxy-4-nitroaniline | ----do---- | Reddish yellow. |
| 64 | 2-methyl-4-nitroaniline | ----do---- | Orange. |
| 65 | 2-nitro-4-methoxyaniline | ----do---- | Reddish yellow. |
| 66 | 2:5-dichloroaniline | ----do---- | Orange. |
| 67 | 4-chloroaniline | 1-phenyl-3-N-(2'-methoxyphenyl)carbamoyl-5-pyrazolone | Reddish yellow. |
| 68 | 2-chloroaniline | ----do---- | Do. |
| 69 | β-Ethoxyethyl p-aminobenzoate | ----do---- | Do. |
| 70 | β-Ethoxyethyl anthranilate | ----do---- | Do. |
| 71 | β-Ethoxyethyl m-aminobenzoate | ----do---- | Do. |
| 72 | 4-nitroaniline | ----do---- | Do. |
| 73 | 3-chloroaniline | ----do---- | Do. |
| 74 | 2:4-dichloroaniline | ----do---- | Yellow. |
| 75 | 4-chloroaniline | 1-phenyl-3-N-phenylcarbamoyl-5-pyrazolone | Do. |
| 76 | 2-chloroaniline | ----do---- | Do. |
| 77 | 3-chloroaniline | ----do---- | Do. |
| 78 | β-Ethoxyethyl p-aminobenzoate | ----do---- | Do. |
| 79 | β-Ethoxyethyl anthranilate | ----do---- | Do. |
| 80 | β-Ethoxyethyl m-aminobenzoate | ----do---- | Do. |
| 81 | 2-nitroaniline | ----do---- | Do. |
| 82 | 4-nitroaniline | ----do---- | Reddish yellow. |
| 83 | 2:4-dichloroaniline | ----do---- | Do. |
| 84 | 4-chloroaniline | 1-(naphth-1'-yl)-3-carbamoyl-5-pyrazolone | Yellow. |
| 85 | ----do---- | 1-(naphth-2'-yl)-3-carbamoyl-5-pyrazolone | Reddish yellow. |
| 86 | 4-aminophenyl methyl sulphone | 1-phenyl-3-N-(4'-methoxyphenyl)-carbamoyl-5-pyrazolone | Do. |
| 87 | 2-aminobenzonitrile | ----do---- | Do. |
| 88 | 2-amino-6-thiocyanobenzthiazole | ----do---- | Do. |
| 89 | 4-chloroaniline | 1-phenyl-3-piperidinocarbonyl-5-pyrazolone | Orange. |
| 90 | ----do---- | 1-phenyl-3-morpholinocarbonyl-5-pyrazolone | Reddish yellow. |
| 91 | ----do---- | 1-(4'-chlorophenyl)-3-N-(4'-methoxy-phenyl)carbamoyl-5-pyrazolone | Do. |
| 92 | 4-aminoazobenzene | ----do---- | Do. |
| 93 | 2-amino-6-thiocyanobenzthiazole | 1-phenyl-3-carbamoyl-5-pyrazolone | Orange. |
| 94 | 2-aminobenzonitrile | 1-phenyl-3-N-(4'-ethoxyphenyl)carbamoyl-5-pyrazolone | Do. |
| 95 | 2-methyl-5-chloroaniline | 1-phenyl-3-N-(4'-methoxyphenyl)carbamoyl-5-pyrazolone | Reddish yellow. |
| 96 | 2-methyl-4-chloroaniline | ----do---- | Do. |
| 97 | 2-methyl-3-chloroaniline | ----do---- | Do. |
| 98 | 2-methyl-5-chloroaniline | 1-phenyl-3-N-phenylcarbamoyl-5-pyrazolone | Do. |
| 99 | 2-methyl-4-chloroaniline | ----do---- | Do. |
| 100 | 2-methyl-3-chloroaniline | ----do---- | Do. |
| 101 | 2-amino-6-cyanobenzthiazole | ----do---- | Do. |
| 102 | 2-naphthylamino-6-diethylsulphonamide | ----do---- | Do. |
| 103 | 2-aminobenzthiazole-6-methylsulphone | ----do---- | Orange. |
| 104 | 2-amino-6-nitrobenzthiazole | ----do---- | Do. |
| 105 | 2-amino-5-nitrothiazole | ----do---- | Do. |
| 106 | 2-aminobenzoic acid diethylamide | 1-phenyl-3-N-(4'-methoxyphenyl)-carbamoyl-5-pyrazolone | Reddish Yellow. |
| 107 | 2-aminobenzoic acid di-n-propylamide | ----do---- | Do. |
| 108 | 3-aminobenzoic acid diethylamide | ----do---- | Do. |
| 109 | 2-aminobenzoic acid diethylamide | 1-phenyl-3-N-phenylcarbamoyl-5-pyrozolone | Do. |
| 110 | 2-aminobenzoic acid di-n-propylamide | ----do---- | Do. |
| 111 | 3-aminobenzoic acid diethylamide | ----do---- | Do. |
| 112 | 4-chloroaniline | 1-(4'-methoxyphenyl)-3-N-phenylcarbamoyl-5-pyrazolone | Do. |
| 113 | 2:4-dichloroaniline | ----do---- | Do. |
| 114 | 4-nitroaniline | ----do---- | Do. |
| 115 | 2-naphthylamine-6-diethylsulphonamide | ----do---- | Do. |
| 116 | Anthranilic acid | ----do---- | Do. |

*Example 117*

A padding liquor is prepared by milling 12 parts of 1 - phenyl - 3 - N - (4' - methoxyphenyl)carbamoyl-4-(2"-chlorophenylazo)-5-pyrazolone with 1 part of the sodium salt of a formaldehyde-naphthalene sulphonic acid condensate, 2 parts of an octyl phenol-ethylene oxide condensate and 100 parts of water and mixing the dispersion with 200 parts of sodium alignate. Polyethylene terephthalate fabric is padded with this liquor, dried and heated at 200° C. for 2 minutes to fix the dyestuff. The dyed fabric is then rinsed and treated with sodium hydrosulphite as described in Example 1. Fixed in this way the dyestuff has good fastness, especially to dry heat treatment.

We claim:
1. A process for the coloration of aromatic polyester textile material which comprises applying thereto a water-insoluble dyestuff of the formula

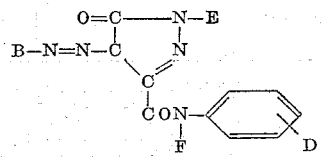

wherein B is selected from the class consisting of radicals of the benzene, naphthalene, thiazole and benzthiazole series, E represents a radical of the benzene series, F is selected from the class consisting of hydrogen atoms, lower alkyl radicals; and D is selected from the class consisting of hydrogen atoms, and lower alkoxy and alkoxyalkoxy radicals.

2. A process for the coloration of aromatic polyester textile material which comprises applying thereto 1-phenyl-3 - N - (4'-methoxyphenyl)carbamoyl-4-(4"-chlorophenylazo)-5-pyrazolone.

3. A process for the coloration of aromatic polyester textile material which comprises applying thereto 1-phenyl-3 - N - (4'-methoxyphenyl)carbamoyl-4-(2"-chlorophenylazo)-5-pyrazolone.

4. A process for the coloration of aromatic polyester textile material which comprises applying thereto 1-phenyl-3 - N-(2'-methoxyphenyl)carbamoyl-4-[4"-carbo($\beta$-ethoxyethoxy)phenylazo]-5-pyrazolone.

5. A process for the coloration of aromatic polyester textile material which comprises applying thereto 1-phenyl-3 - N - phenylcarbamoyl-4-[4"carbo($\beta$-ethoxyethoxy)phenylazo]-5-pyrazolone.

6. A process for the coloration of aromatic polyester textile material which comprises applying thereto 1-phenyl-3 - N-phenylcarbamoyl-4-[3"-carbo($\beta$-ethoxyethoxy)phenylazo]-5-pyrazolone.

References Cited by the Examiner
UNITED STATES PATENTS

| | | | |
|---|---|---|---|
| 2,038,298 | 4/36 | Kiernan et al. | 260—163 |
| 2,330,828 | 10/43 | Lubowe et al. | 260—163 |
| 2,898,178 | 8/59 | Kruckenberg | 8—41 |
| 2,955,901 | 10/60 | Kruckenberg | 8—41 |
| 3,037,974 | 6/62 | Kracker et al. | |
| 3,057,848 | 10/62 | Dehn et al. | 8—41 X |
| 3,097,197 | 7/63 | Tilley et al. | 8—41 X |

NORMAN G. TORCHIN, *Primary Examiner.*

A. LOUIS MONACELL, *Examiner.*